United States Patent
Chen

(10) Patent No.: US 10,668,966 B2
(45) Date of Patent: Jun. 2, 2020

(54) BRACKET AND SCOOTER STORAGE BOX WITH BRACKET

(71) Applicant: Xuewen Chen, Beijing (CN)

(72) Inventor: Xuewen Chen, Beijing (CN)

(73) Assignee: Xuewen Chen, Beijing (CN)

( * ) Notice: Subject to any disclaimer, the term of this patent is extended or adjusted under 35 U.S.C. 154(b) by 0 days.

(21) Appl. No.: 16/175,879

(22) Filed: Oct. 31, 2018

(65) Prior Publication Data
US 2020/0031414 A1   Jan. 30, 2020

(30) Foreign Application Priority Data

Jul. 26, 2018   (CN) .......................... 2018 1 0834681

(51) Int. Cl.
| | |
|---|---|
| *F16M 11/00* | (2006.01) |
| *B62H 3/12* | (2006.01) |
| *B62K 15/00* | (2006.01) |
| *G06Q 30/06* | (2012.01) |
| *G07F 17/00* | (2006.01) |
| *B62H 3/00* | (2006.01) |

(52) U.S. Cl.
CPC ............... *B62H 3/12* (2013.01); *B62K 15/00* (2013.01); *G06Q 30/0645* (2013.01); *G07F 17/0057* (2013.01); *B62H 2003/005* (2013.01); *B62K 2202/00* (2013.01)

(58) Field of Classification Search
CPC ........ B62K 15/00; G06Q 30/068; H02J 7/025
See application file for complete search history.

(56) References Cited

U.S. PATENT DOCUMENTS

| | | | |
|---|---|---|---|
| 9,701,212 B2* | 7/2017 | Baarman | B60L 11/182 |
| 9,889,755 B2* | 2/2018 | Frament | B60L 11/182 |
| 2010/0228405 A1* | 9/2010 | Morgal | B62H 3/02 701/2 |
| 2011/0006729 A1* | 1/2011 | Matthias | B25H 3/006 320/107 |
| 2017/0037671 A1* | 2/2017 | Angiuli | E05F 15/686 |
| 2019/0054832 A1* | 2/2019 | Lin | E04H 6/22 |

* cited by examiner

*Primary Examiner* — Amy J. Sterling
(74) *Attorney, Agent, or Firm* — Gang Yu

(57) ABSTRACT

The present disclosure provides a bracket and a scooter storage box having same. The bracket is used for storing an electric scooter. The bracket includes: a chassis, the chassis being provided with a recess portion for receiving a wheel of the electric scooter, the chassis being further provided with a carrying surface urging against the lower surface of a scooter body of the electric scooter; and a charging portion, electrically connected to the electric scooter to charge the electric scooter. The electric scooter may be limited and carried by the cooperation of the recess portion on the chassis of the bracket and the carrying surface, so that the electric scooter may be steadily stored. Furthermore, the electric scooter may also be charged by the charging potion to meet the charging needs of the electric scooter.

18 Claims, 9 Drawing Sheets

BRACKET AND SCOOTER STORAGE BOX WITH BRACKET

TECHNICAL FIELD

The present disclosure relates to a technical field of electric scooter storage, and more particularly to a bracket and a scooter storage box with the bracket.

BACKGROUND

For convenience of a short-distance trip, an electric scooter may be set as a shared electric scooter to be leased by a user, which requires to put more electric scooters in public places. However, the existing electric scooter easily falls, and it is difficult to store and charge due to the fact that there is no special storage and charging device in public places, so that the sharing needs cannot be met.

SUMMARY

Embodiments of the present disclosure provide a bracket and a scooter storage box with bracket, intended to solve the problem in the conventional art that an electric scooter is difficult to store and charge in public places.

In order to solve the foregoing problem, according to an embodiment of the present disclosure, the present embodiment provides a bracket, used for storing an electric scooter. The bracket includes: a chassis, the chassis being provided with a recess portion for accommodating a wheel of the electric scooter, the chassis being further provided with a carrying surface abutting against a lower surface of a scooter body of the electric scooter; and a charging portion, electrically connected with the electric scooter to charge the electric scooter.

In some embodiments, the chassis includes: a limiting plate, the limiting plate being provided with a strip-shaped through hole, an edge of the strip-shaped through hole being used for, guiding and limiting an wheel; a carrying plate, an end surface of the carrying plate abutting against the lower surface of the scooter body of the electric scooter to carry the scooter body, the end surface of the carrying plate being the carrying surface; and a connecting plate, the connecting plate being used for connecting the limiting plate and the carrying plate.

In some embodiments, the carrying plate is horizontally arranged, the connecting plate is inclined relative to a horizontal plane, the limiting plate is located below the carrying plate, there are two carrying plates, there are two connecting plates, the two carrying plates and the two connecting plates are connected in one-to-one correspondence, and an area between the two connecting plates and the limiting plate forms the recess portion.

In some embodiments, the bracket further includes a vertical plate, the vertical plate is arranged on the chassis and located at, one end of a length direction of the chassis, the charging portion includes: a charging plug, arranged on the vertical plate, the charging plug is electrically connected with the electric scooter to charge the electric scooter, and after being put to a predetermined position on the chassis, the electric scooter can be in insertion connection with the charging plug to realize electrical connection.

In some embodiments, there are one vertical plate and one charging plug, and an end, away from the vertical plate, of the chassis is a taking and putting end for taking out and putting in the electric scooter; or, there are two, vertical plates and two charging plugs, the two vertical plates are located at both ends of the chassis respectively, the two charging plugs and the two vertical plates are arranged in one-to-one correspondence, an area, located between the two vertical plates, of the chassis is a taking and putting area for taking out and putting in the electric scooter, and the electric scooter is in insertion connection with one of the two charging plugs selectively.

In some embodiments, the charging portion includes: a wireless charging device, arranged on the chassis, the wireless charging device being used for wirelessly charging the electric scooter.

In some embodiments, the bracket further includes: a control portion, the control portion being used for detecting an electric quantity of the electric scooter, and the control portion being capable of controlling the charging portion to charge or not.

According to another embodiment of the present disclosure, a scooter storage box for storing an electric scooter is provided. The scooter storage box includes a box body and a bracket arranged in the box body, the bracket is the bracket provided above, an access port is provided on the box body, and the access port is used for taking out and putting in the electric scooter.

In some embodiments, there are multiple brackets, and the scooter storage box further includes: a conveying mechanism, arranged in the scooter storage box, the multiple brackets being arranged on the conveying mechanism at intervals, and the conveying mechanism being capable of conveying any one bracket of the multiple brackets to the access port.

In some embodiments, the conveying mechanism includes: an annular conveying chain, arranged in the box body along a vertical direction; and a driving wheel, the driving wheel being connected with the annular conveying chain drivingly, the driving wheel being used for driving the annular conveying chain to rotate, the multiple brackets being hinged to the annular conveying chain along a circumference of the annular conveying chain.

In some embodiments, the bracket further includes a hanger, the hanger is connected with a chassis of the bracket, the hanger is used for hanging the chassis, and the hanger is hinged to the annular conveying chain to make the chassis keep horizontal.

In some embodiments, the annular conveying chain is provided around a predetermined axis, and a length direction of the bracket is parallel to the predetermined axis; an extending direction of the access port is parallel to the length direction of the bracket, so as to put in or take out the electric scooter along the length direction of the bracket at the access port; or, an extending direction of the access port is parallel to a width direction of the bracket, so as to put in or take out the electric scooter along the width direction of the bracket at the access port.

In some embodiments, the scooter storage box further includes: a lifting door, movably arranged on the box body, the lifting door being used for opening or closing the access port.

In some embodiments, the scooter storage box further includes: an operation panel, arranged on the box body, the operation panel being used for user operation; and/or, a face recognition device, arranged on the box body, the face recognition device being used for user recognition.

In some embodiments, the scooter storage box further includes: a recognizer, arranged on the box body, the recognizer being used for recognizing information of the electric scooter; and/or, a positioning device, arranged on the box body.

The technical solution of the present disclosure provides a bracket in which the chassis and the charging portion are arranged. Thus, the electric scooter may be limited and carried by the cooperation of the recess portion on the chassis and the carrying surface, so that the electric scooter may be steadily stored and prevented from falling. Furthermore, the electric scooter may also be charged by the charging potion to meet the charging needs of the electric scooter. The technical solution of the present disclosure also provides a scooter storage box. The storage box is convenient for storage, charging and management of the electric scooter in public places, so as to realize sharing of the electric scooter.

BRIEF DESCRIPTION OF THE DRAWINGS

The accompanying drawings, which constitute a part of this application, are used to provide a further understanding of the present disclosure, and the exemplary embodiments of the present disclosure and the description thereof are used to explain the present disclosure, but do not constitute improper limitations to the present disclosure. In the drawings.

The drawings include the following reference signs:
100: bracket; 110: chassis; 111: limiting plate; 112: carrying plate; 113: connecting plate; 114: vertical plate; 121: charging plug; 122: wireless charging, device; 130: hanger; 200: box body; 201: access port; 202: recognizer; 301: annular conveying chain; 302: driving wheel; 400: lifting door; 500: operation panel; 600: power supply device.

DETAILED DESCRIPTION OF THE EMBODIMENTS

The technical solutions in the embodiments of the present disclosure will be clearly and completely described hereinbelow with the drawings in the embodiments of the present disclosure. It is apparent that the described embodiments are only part of the embodiments of the present disclosure, not all of the embodiments. The following description of at least one exemplary embodiment is only illustrative actually, and is not used as any limitation for the present disclosure and the application or use thereof. On the basis of the embodiments of the present disclosure, all other embodiments obtained on the premise of no creative work of those of ordinary skill in the art fall within the scope of protection of the present disclosure.

As shown in FIG. 1 to FIG. 4, the embodiment of the present disclosure provides a bracket. The bracket is used for storing an electric scooter. The bracket includes: a chassis 110, the chassis 110 being provided with a recess portion for accommodating a wheel of the electric scooter, the chassis 110 being further provided with a carrying surface abutting against a lower surface of a scooter body of the electric scooter; and a charging portion, electrically connected with the electric scooter to charge the electric scooter.

The technical solution of the present embodiment provides a bracket in which the chassis 110 and the charging portion are arranged. Thus, the electric scooter may be limited and carried by the cooperation of the recess portion on the chassis 110 and the carrying surface, so that the electric scooter may be steadily stored and prevented from falling. Furthermore, the electric scooter may also be charged by the charging potion to meet the charging needs of the electric scooter. The bracket may be used separately, e.g., placed in public places fixedly, or may also be used in cooperation with other components.

Figure 1:
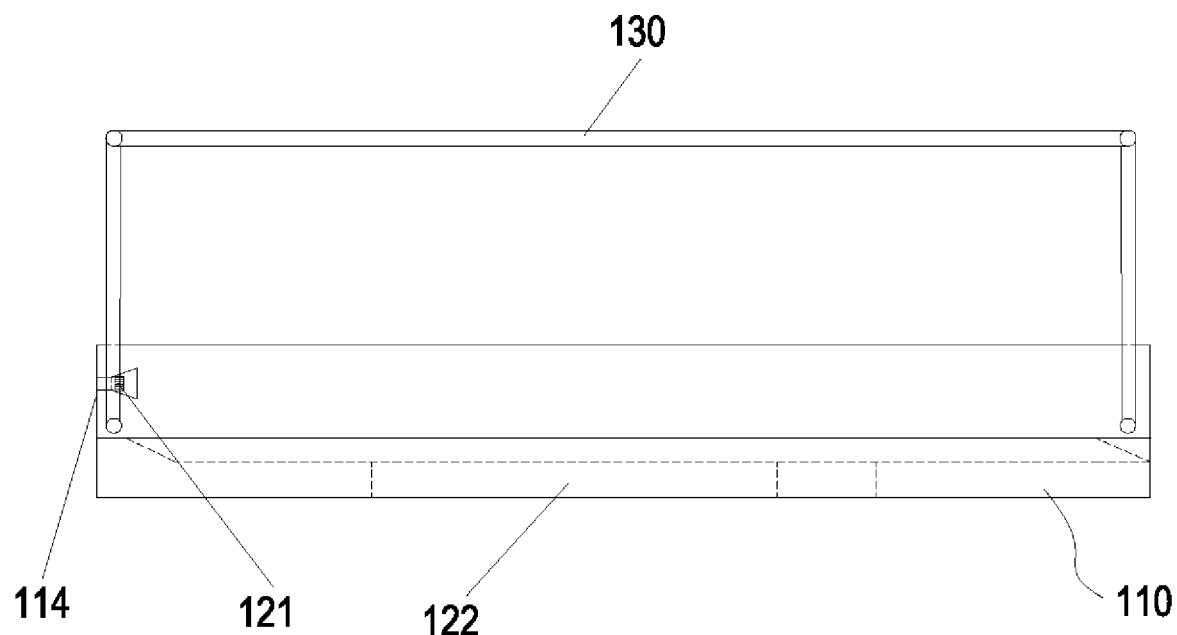
FIG. 1 illustrates a structural schematic diagram of a bracket according to Embodiment 1 of the present disclosure.
Figure 2:
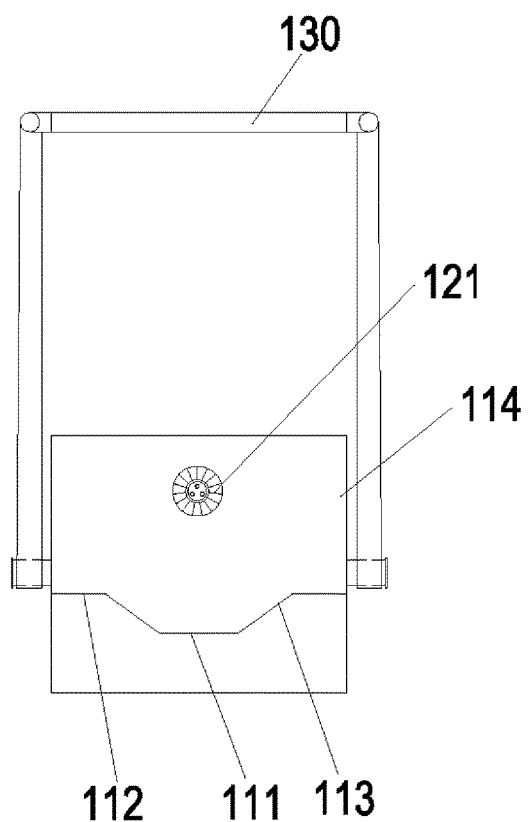
FIG. 2 illustrates a side view of the bracket in FIG. 1.
Figure 3:
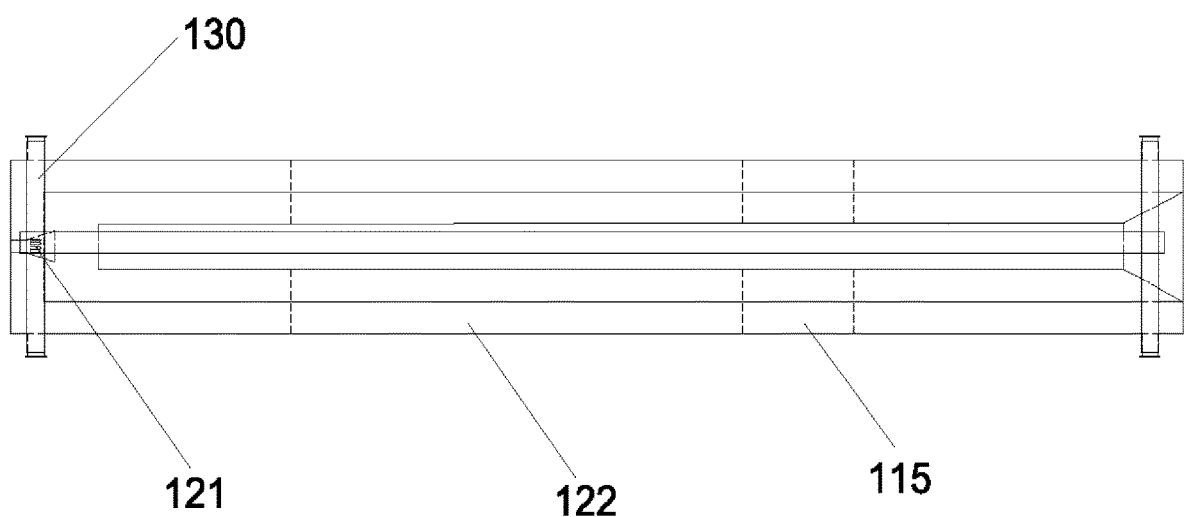
FIG. 3 illustrates a top view of the bracket in FIG. 1.
Figure 4:
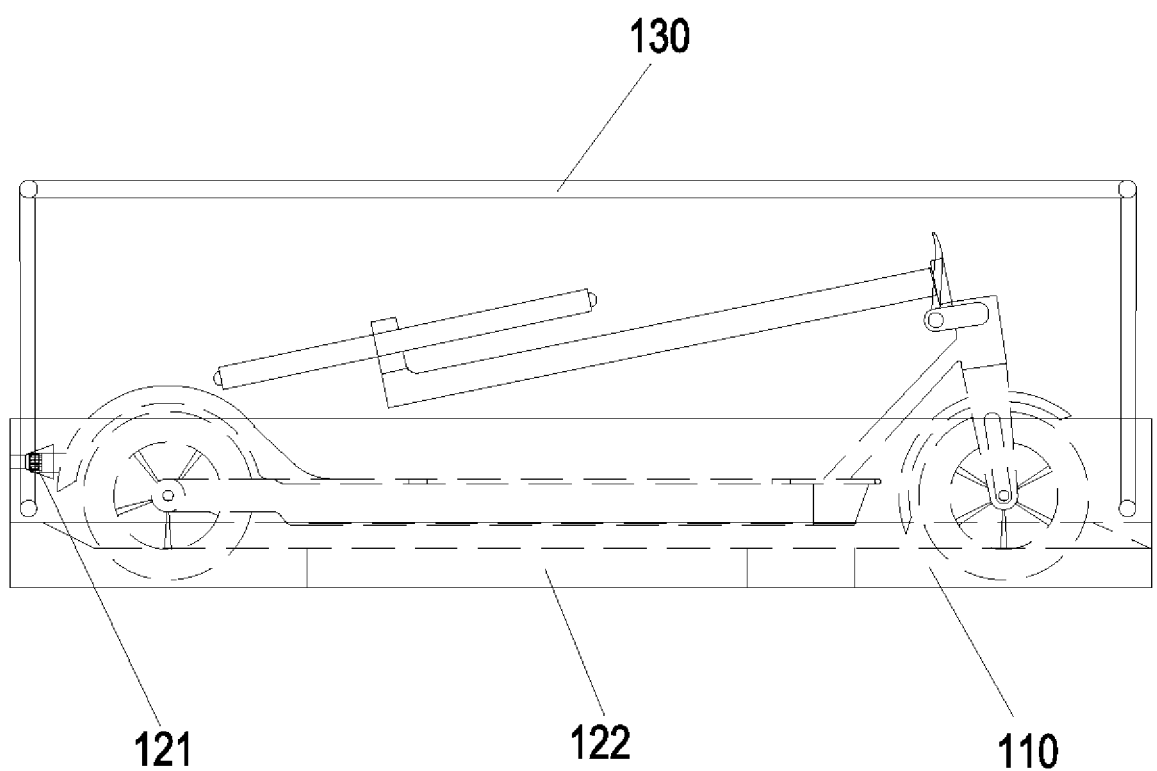
FIG. 4 illustrates a schematic diagram of the bracket in FIG. 1 in which an electric scooter is put.

As shown in FIG. 2, the chassis 110 includes: a limiting plate 111, the limiting plate 111 being provided with a strip-shaped through hole, an edge of the strip-shaped through hole being used for guiding and limiting an wheel; a carrying plate 112, an end surface of the carrying plate 112 abutting against the lower surface of the scooter body of the electric scooter to carry the scooter body, the end surface of the carrying plate 112 being the carrying surface; and a connecting plate 113, the connecting plate 113 being used for connecting the limiting plate 111 and the carrying plate 112. Thus, the edge of the strip-shaped through hole on the limiting plate 111 can be used for guiding and limiting the wheel, and the scooter body of the electric scooter can be carried by the end surface of the carrying plate 112. In such a way, the stability of storage of the electric scooter may be ensured. In the present embodiment, the length of the strip-shaped through hole may be set to be slightly greater than the wheelbase of the electric scooter and the sum of diameters of two wheels, and the strip-shaped through hole is slightly wider than the tire or hub of the electric scooter.

In some embodiments, the carrying plate 112 is horizontally arranged, the connecting plate 113 is inclined relative to a horizontal plane, the limiting plate 111 is located below the carrying plate 112, there are two carrying plates 112, there are two connecting plates 113, the two carrying plates 112 and the two connecting plates 113 are connected in one-to-one correspondence, and an area between the two connecting plates 113 and the limiting plate 111 forms the recess portion. Thus, the limiting and supporting reliability of the electric scooter can be improved.

In the present embodiment, the bracket further includes a vertical plate 114, the vertical plate 114 is arranged on the chassis 110 and located at one end of a length direction of the chassis 110, the charging portion includes: a charging plug 121, arranged on the vertical plate 114, the charging plug 121 is electrically connected to the electric scooter to charge the electric scooter, and after being put to a predetermined position on the chassis 110, the electric scooter can be in insertion connection with the charging plug 121 to realize electrical connection. Thus, after the electric scooter is put onto the chassis 110, the electric scooter is stored, and furthermore, the electrical connection may also be realized by insertion connection so as to charge the electric scooter. Thus, the operation can be reduced for convenience of management.

In the present embodiment, there may be one vertical plate 114 and one charging plug 121, and an end, away from the vertical plate 114, of the chassis 110 is a taking and putting end for taking out and putting in the electric scooter. There may also be two vertical plates 114 and two charging plugs 121, the two vertical plates 114 are located at both ends of the chassis 110 respectively, the two charging plugs 121 and the two vertical plates 114 are arranged in one-to-one correspondence, an area, located between the two vertical plates 114, of the chassis 110 is a taking and putting area for taking out and putting in the electric scooter, and the electric scooter may be in insertion connection with one of the two charging plugs 121 selectively. Thus, the electric scooter may be taken out or put in and charged by selecting any one of the two manners.

In the present embodiment, the charging portion includes: a wireless charging device 122, arranged on the chassis 110, the wireless charging device 122 being used for wirelessly charging the electric scooter. Thus, the electric scooter may be charged wirelessly. The charging plug 121 and the wireless charging device 122 may be arranged in the bracket simultaneously, so as to select to adopt a wireless charging manner or a wired charging manner as required.

In the present embodiment, the bracket further includes: a control portion, the control portion being used for detecting an electric quantity of the electric scooter, and the control portion being capable of controlling the charging portion to charge or not. Thus, after the electric scooter is placed on the chassis 110, the control portion may be used to detect the electric quantity of the electric scooter, when the electric quantity is insufficient, the charging portion is controlled to charge the electric scooter, and when the electric scooter is fully charged, the charging portion is controlled to power off.

The present disclosure also provides a scooter storage box for storing an electric scooter. The scooter storage box includes a box body 200 and a bracket 100 arranged in the box body 200, the bracket 100 is the bracket 100 provided in the above embodiment, an access port 201 is provided on the box body 200, and the access port 201 is used for taking out and putting in the electric scooter. The storage box is convenient for storage, charging and management of the electric scooter in public places, so as to realize sharing of the electric scooter. The scooter storage box is adopted for self-service renting operation of an electric scooter, so that not only the parking occupation is greatly reduced, but also the charging safety can be improved, and the field workload and working strength of scooter collection and charging are reduced, thus reducing the labor cost and the transportation cost.

As shown in FIG. 5 to FIG. 10, there are multiple brackets 100, and the scooter storage box further includes: a conveying mechanism, arranged in the scooter storage box, the multiple brackets 100 being arranged on the conveying mechanism at intervals, and the conveying mechanism being capable of conveying any one bracket 100 in the multiple brackets 100 to the access port 201. Thus, multiple brackets 100 may be placed in the scooter storage box to store multiple electric scooters, so that the occupation space of the electric scooters can be reduced for convenience of management. Moreover, the conveying mechanism may convey the bracket 100 with the electric scooter to the access port 201 for convenience of the taking and using operation of a user, or may convey the unoccupied bracket 100 to the access port 201 for convenience of the returning process of the user.

Specifically, the conveying mechanism includes: an annular conveying chain 301, arranged in the box body 200 along a vertical direction; and a driving wheel 302, the driving wheel being connected with the annular conveying chain 301 drivingly, the driving wheel 302 being used for driving the annular conveying chain 301 to rotate, multiple brackets 100 being hinged to the annular conveying chain 301 along the circumference of the annular conveying chain 301. Thus, the annular conveying chain 301 may rotate to drive the multiple brackets 100 to move upward or downward, so as to convey the needed bracket 100 to the access port 201. A motor may also be arranged in the conveying mechanism. The motor drives the driving wheel 302 to rotate, so as to drive the annular conveying chain 301 to rotate.

In the present embodiment, the bracket 100 further includes a hanger 130, the hanger 130 being connected with a chassis 110 of the bracket 100, the hanger 130 being used for hanging the chassis 110, the hanger 130 being hinged to the annular conveying chain 301 to make the chassis 110 keep horizontal.

In the present embodiment, a bearing structure may be disposed in the box body 200 to support components such as the conveying mechanism and the bracket 100, so as to ensure the overall structural strength of the scooter storage box. The bearing structure is composed of two bearing supports arranged oppositely and multiple beams arranged between the two bearing supports. Two opposite sides of the two bearing supports arranged oppositely are provided with an annular conveying chain 301 separately, multiple hanging arms are arranged on each annular conveying chain 301 at predetermined intervals, and the hanging arms arranged oppositely on the two annular conveying chains 301 are hinged to a hanger 130. Specifically, the hanger 130 includes a cross rod and four hanging rods connected to the cross rod respectively, the four hanging rods being fixedly connected to four corners of the chassis 110 respectively. The two hanging arms arranged oppositely are hinged to the cross rod of a hanger 130 separately, so as to hang and support the bracket 100. By means of the above arrangement, the scooter storage box may be of a high-strength stereo structure, so that multiple electric scooters may be stored simultaneously, the occupation area of the electric scooters is reduced, and the sufficient reliability and service life of the scooter storage box may be ensured by such arrangement.

In the present embodiment, the annular conveying chain 301 is provided around a predetermined axis, and the length direction of the bracket 100 is parallel to the predetermined axis. In the present embodiment, a bracket 100 stores an electric scooter, and the length direction of the put-in electric scooter is consistent with the length direction of the chassis 110.

Figure 5:
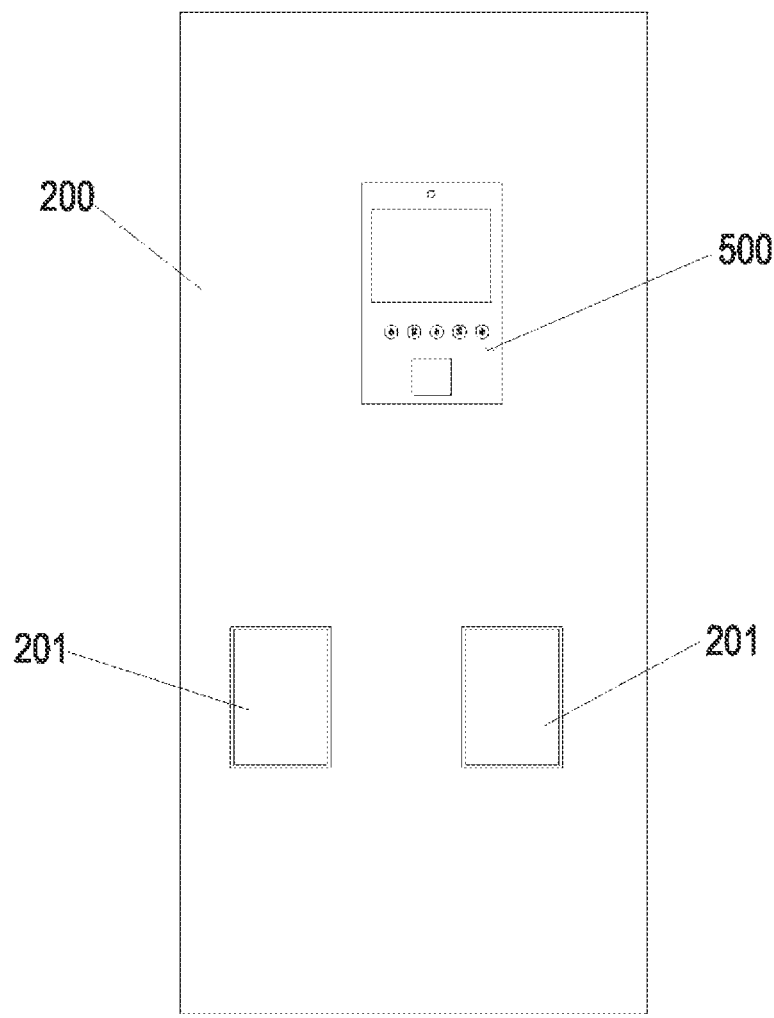
FIG. 5 illustrates a structural schematic diagram of a scooter storage box according to Embodiment 2 of the present disclosure.
Figure 6:
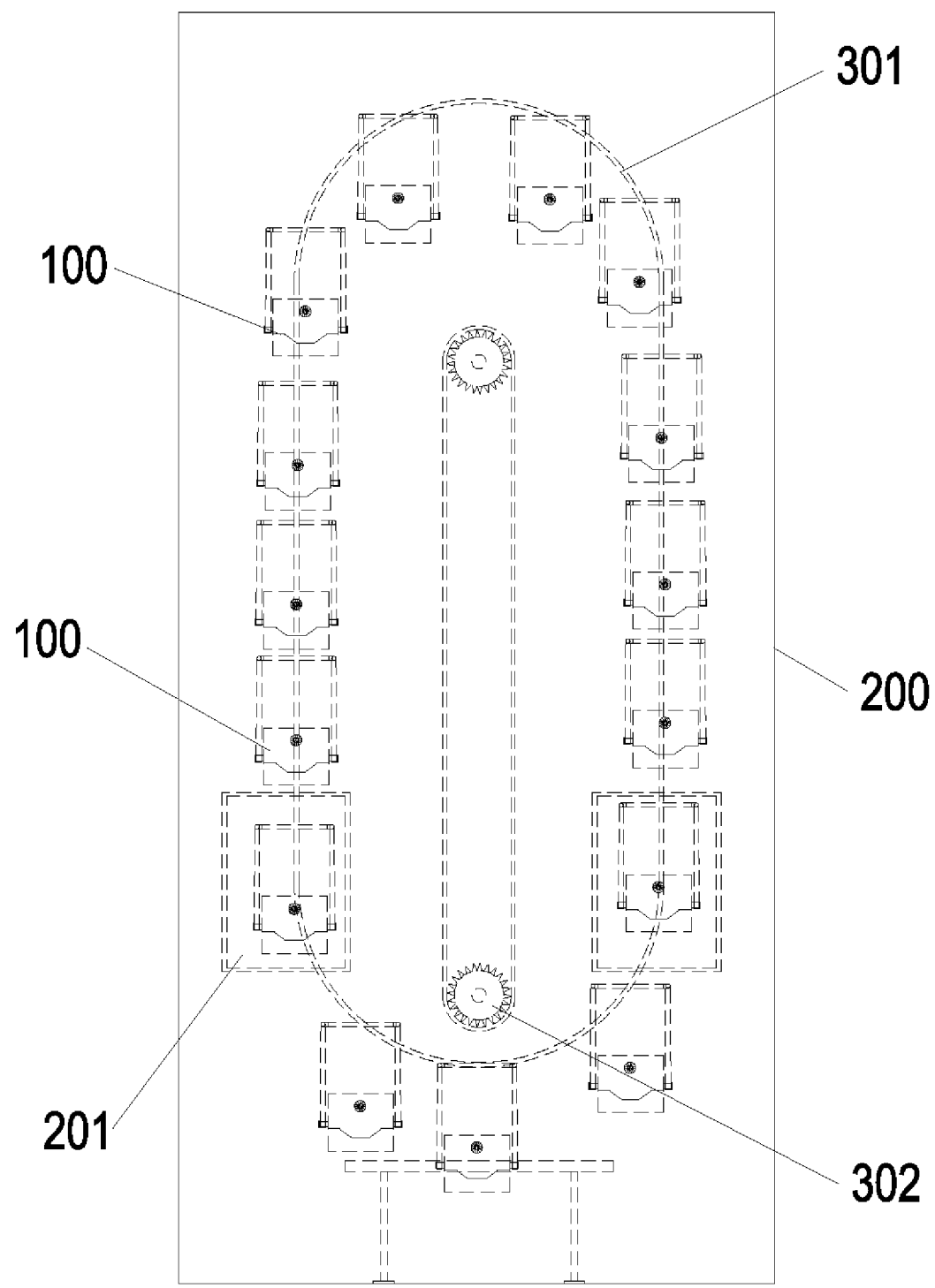
FIG. 6 illustrates a perspective view of the scooter storage box in FIG. 5.
Figure 7:
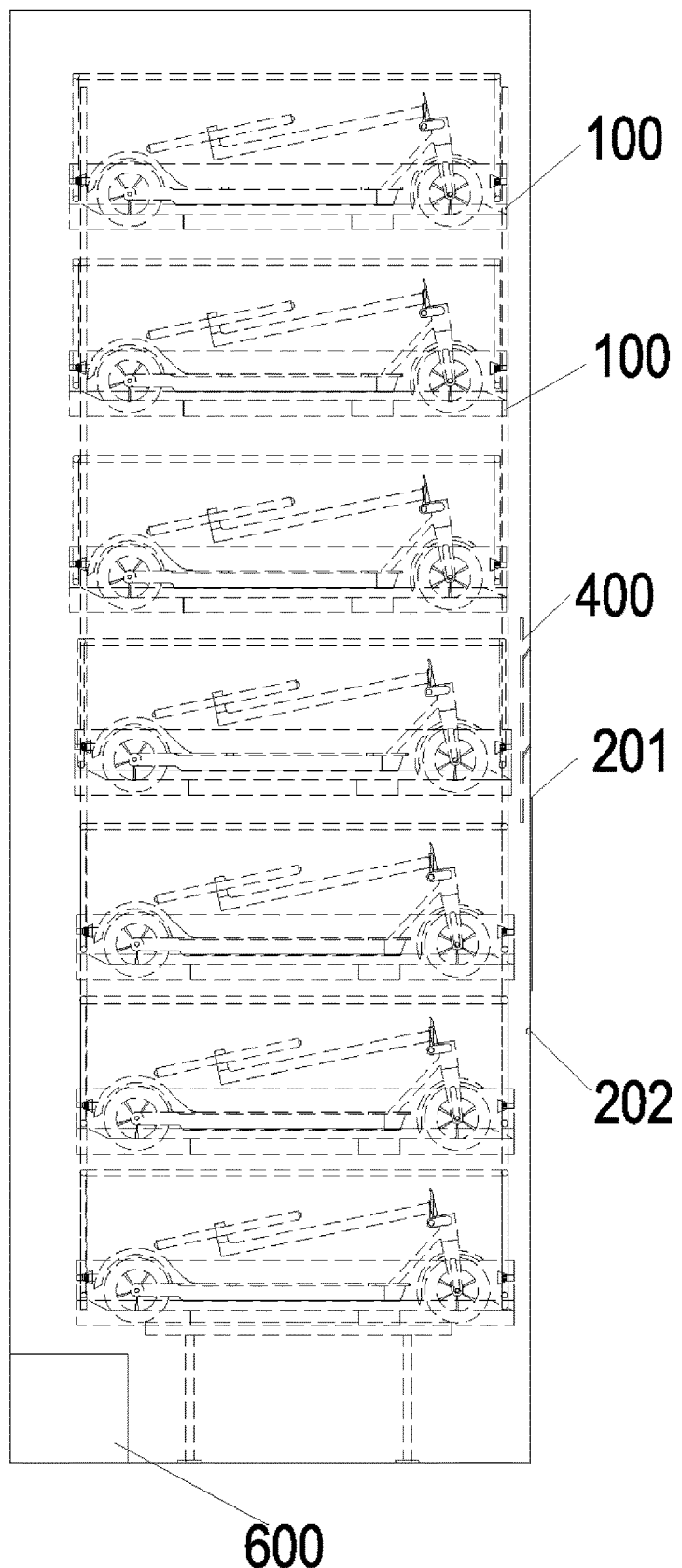
FIG. 7 illustrates a side view of the scooter storage box in FIG. 6.
Figure 8:
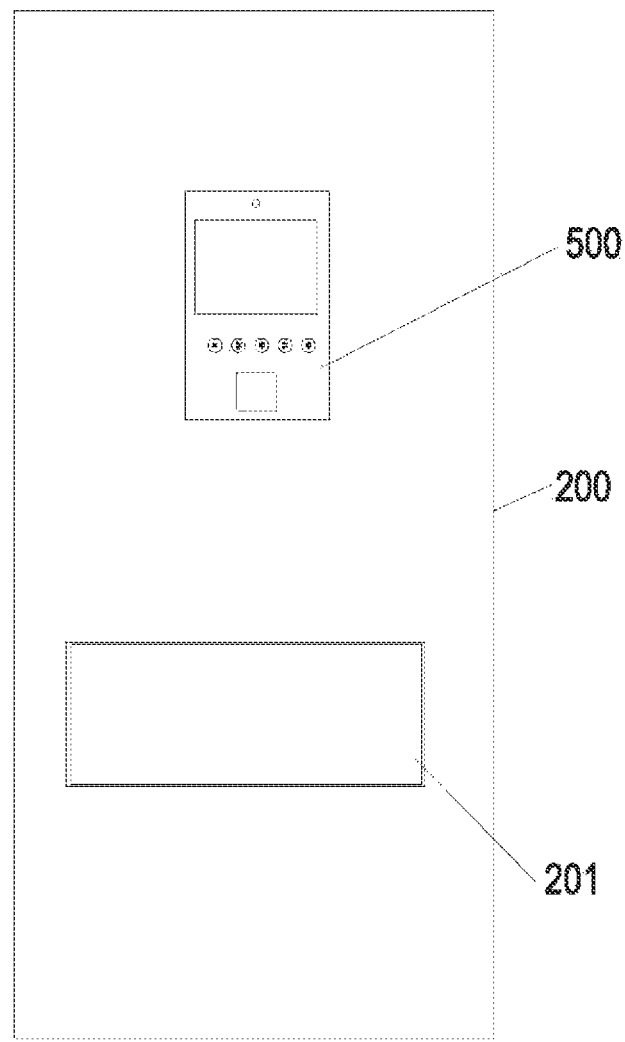
FIG. 8 illustrates a structural schematic diagram of a scooter storage box according to Embodiment 3 of the present disclosure.
Figure 9:
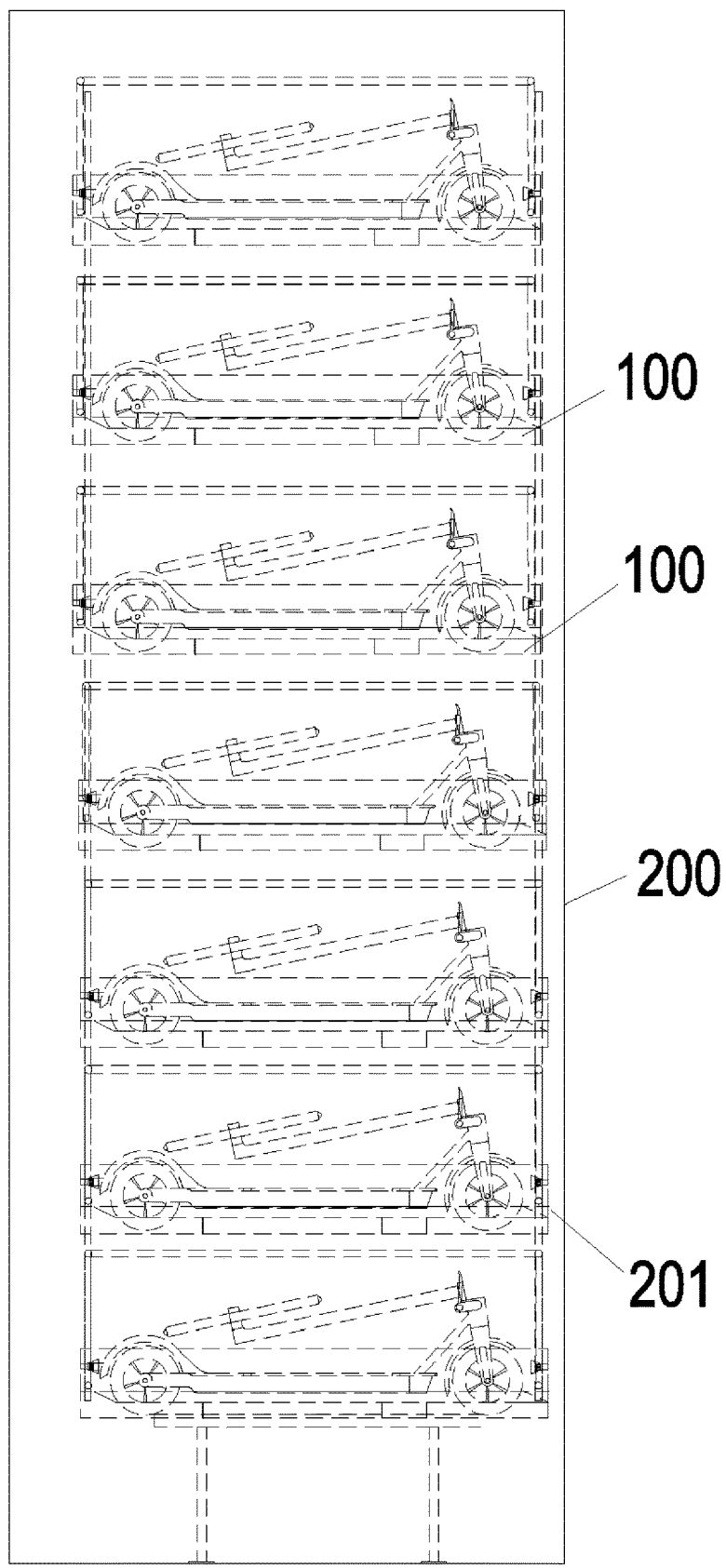
FIG. 9 illustrates a perspective view of the scooter storage box in FIG. 8.
Figure 10:
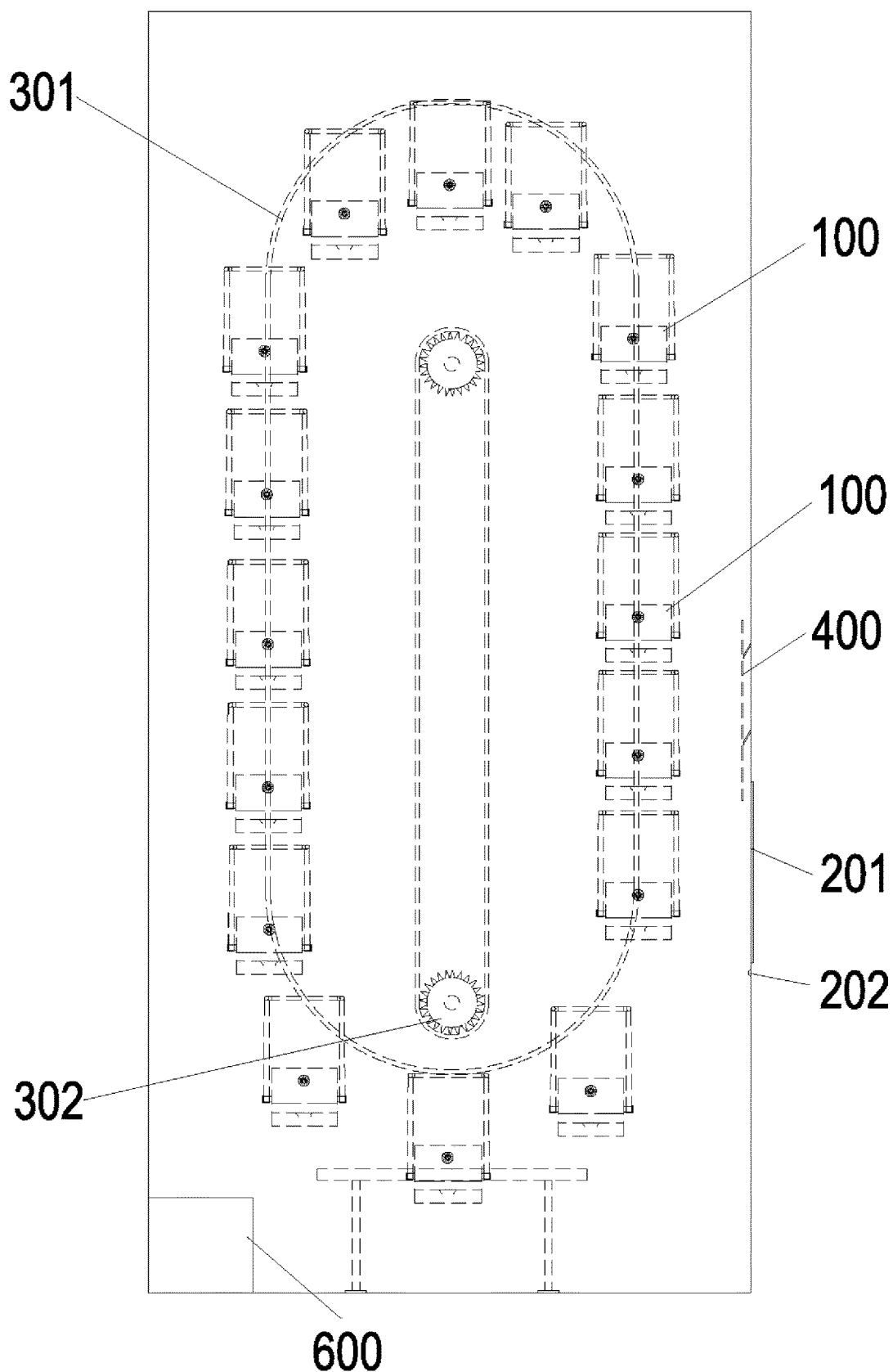
FIG. 10 illustrates a side view of the scooter storage box in FIG. 9.

As shown in FIG. 5 to FIG. 7, the extending direction of the access port 201 is parallel to the length direction of the bracket 100, so as to put in or take out the electric scooter along the length direction of the bracket 100 at the access port 201. Or, as shown in FIG. 8 to FIG. 10, the extending direction of the access port 201 is parallel to the width direction of the bracket 100, so as to put in or take out the electric scooter along the width direction of the bracket 100 at the access port 201. The scooter storage box may be arranged in the above two manners.

In the present embodiment, the scooter storage box further includes: a lifting door 400, movably arranged on the box body 200, the lifting door 400 being used for opening or closing the access port 201. The access port 201 and the electric scooter in the box body 200 may be protected by the lifting door 400, so that the safety can be improved, and the scooter storage box is more attractive. In order to further improve the safety, a sensor may be arranged at the access port 201. When the sensor senses that there is a barrier in the access port 201, the lifting door 400 is not closed. When the sensor senses that there is not a barrier in the access port 201, the lifting door 400 is closed. Thus, the lifting door 400 may be prevented from pinching a user.

In the present embodiment, the scooter storage box further includes: an operation panel 500, arranged on the box body 200, the operation panel 500 being used for user operation. The operation panel 500 is convenient for user operation to take or return the electric scooter or perform other operations. An interactive screen, a camera, a microphone, a loudspeaker or other devices may be arranged in the operation panel 500. In the present embodiment, the scooter storage box further includes: a face recognition device, arranged on the box body 200, the face recognition device being, used for user recognition. The face recognition device is convenient for recognizing the user identity.

In the present embodiment, a communication device may be arranged in the scooter storage box, and the communication device may be electrically connected to the operation panel 500 or other electrical components and may wirelessly communicate with a cloud side or a control center to transmit information. Thus, it is convenient for the user to take and return the electric scooter, and convenient for staff to manage the scooter storage box and the electric scooter.

In the present embodiment, the scooter storage box further includes: a recognizer 202, arranged on the box body 200, the recognizer 202 being used for recognizing the information of the electric scooter. Each electric scooter may be provided with a unique number, and the information of the electric scooter may be recognized by the recognizer 202 for ease of the management of the electric scooter. The recognizer 202 may be set as a Radio Frequency Identification (RFID) receiver, and an RFID chip is arranged in the electric scooter, so that information in the RFID chip may be recognized by the RFID receiver.

In the present embodiment, a positioning device may also be arranged in the scooter storage box, and the position of the scooter storage box may be determined by the positioning device for ease of management. The positioning device may be arranged on the box body 200. For example, the positioning device may be set as a SIM card for positioning through a Beidou system or a Global Positioning System (GPS). Furthermore, the positioning device may also be used for information transmission and communication.

In the present embodiment, the scooter storage box may be set to be of a closed structure having multiple surfaces such as a cuboid structure. The surface of the scooter storage box may serve as a carrier for posting information, so as to achieve the effect of publicity or beautification. Or, a screen may be arranged on the surface of the box body 200, the screen being used for playing information. Thus, the effect of publicity or user interaction may be achieved by the screen.

In the present embodiment, the scooter storage box further includes a power supply device 600, arranged in the box body 200, the power supply device 600 being used for supplying power to the scooter storage box.

By means of the bracket provided in the present disclosure, the electric scooter may be limited and carried by the cooperation of the recess portion on the chassis 110 and the carrying surface, so that the electric scooter may be steadily stored and prevented from falling. Furthermore, the electric scooter may also be charged by the charging potion to meet the charging needs of the electric scooter. The bracket may be used separately, e.g., placed in public places fixedly, or may also be used in cooperation with other components. The storage box provided in the present disclosure is convenient for storage, charging and management of the electric scooter in public places, so as to realize sharing of the electric scooter. The scooter storage box is adopted for self-service renting operation of an electric scooter, so that not only the parking occupation is greatly reduced, but also the charging safety can be improved, and the field workload and working strength of scooter collection and charging are reduced, thus reducing the labor cost and the transportation cost.

The technical solution achieves the following technical effects: an electric scooter can be accommodated and stored in a closed space, thereby solving the problems that the scooter is easily damaged and lost, is difficult to manage and affects the appearance of a city due to open storage; the stereo storage of the electric scooter is realized, thereby greatly reducing the required occupation area for the storage of the electric scooter; the controllable wired and wireless charging of the electric scooter in the closed space can be realized, thereby improving the charging safety and reliability of the electric scooter, prolonging the service life of related charging apparatuses, and improving the safety and reliability of the related charging apparatuses; and apparatuses and technical supports are provided, for realizing sharing through targeted self-service renting of the electric scooter.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the spirit and principle of the present disclosure shall fall within the scope of protection of the present disclosure.

It is to be noted that terms used herein only aim to describe specific implementation manners, and are not intended to limit exemplar implementations of this application. Unless otherwise directed by the context, singular forms of terms used herein are intended to include plural forms. Besides, it will be also appreciated that when terms "contain" and/or "include" are used in the description, it is indicated that features, steps, operations, devices, assemblies and/or a combination thereof exist.

Unless otherwise specified, relative arrangements of components and steps elaborated in these embodiments, numeric expressions and numeric values do not limit the scope of the present disclosure. Furthermore, it should be understood that for ease of descriptions, the size of each part shown in the drawings is not drawn in accordance with an actual proportional relation. Technologies, methods and devices known by those skilled in the related art may not be discussed in detail. However, where appropriate, the technologies, the methods and the devices shall be regarded as part of the authorized description. In all examples shown and discussed herein, any specific values shall be interpreted as only exemplar values instead of limited values. As a result, other examples of the exemplar embodiments may have different values. It is to be noted that similar marks and letters represent similar items in the following drawings. As a result, once a certain item is defined in one drawing, it is unnecessary to further discus the certain item in the subsequent drawings.

In the descriptions of the present disclosure, it will be appreciated that locative or positional relations indicated by "front, back, up, down, left, and right", "horizontal, vertical, perpendicular, and horizontal", "top and bottom" and other terms are locative or positional relations shown on the basis of the drawings, which are only intended to make it convenient to describe the present disclosure and to simplify the descriptions without, indicating or impliedly indicating that the referring device or element must have a specific location and must be constructed and operated with the specific location, and accordingly it cannot be understood as limitations to the present disclosure. The nouns of locality "inner and outer" refer to the inner and outer contours of each component.

For ease of description, spatial relative terms such as "over", "above", "on an upper surface" and "upper" may be used herein for describing a spatial position relation between a device or feature and other devices or features shown in the drawings. It will be appreciated that the spatial relative terms aim to contain different orientations in usage or operation besides the orientations of the devices described in the drawings. For example, if the devices in the drawings are inverted, devices described as "above other devices or structures" or "over other devices or structures" will be located as "below other devices or structures" or "under other devices or structures". Thus, an exemplar term "above" may include two orientations namely "above" and "below". The device may be located in other different modes (rotated by 90 degrees or located in other orientations), and spatial relative descriptions used herein are correspondingly explained.

In addition, it is to be noted that terms "first", "second" and the like are used to limit parts, and are only intended to distinguish corresponding parts. If there are no otherwise statements, the above terms do not have special meanings, such that they cannot be understood as limits to the scope of protection of the present disclosure.

What is claimed is:

1. A scooter storage box for storing an electric scooter, the scooter storage box comprising a box body and a bracket provided in the box body, the bracket comprising:
    a chassis, the chassis being provided with a recess portion for accommodating a wheel of the electric scooter, the chassis being further provided with a carrying surface abutting against a lower surface of a scooter body of the electric scooter; and
    a charging portion, electrically connected with the electric scooter to charge the electric scooter,
    wherein, an access port being provided on the box body, the access port being configured to take out and put in the electric scooter;
    wherein there are a plurality of brackets, the scooter storage box further comprising:
    a conveying mechanism, provided in the scooter storage box, the plurality of brackets being provided on the conveying mechanism at intervals, and the conveying mechanism being capable of conveying any one bracket of the plurality of brackets to the access port.

2. The scooter storage box as claimed in claim 1, wherein the conveying mechanism comprises:
    an annular conveying chain, provided in the box body along a vertical direction; and
    a driving wheel, the driving wheel being connected with the annular conveying chain drivingly, the driving wheel being configured to drive the annular conveying chain to rotate,
    the plurality of brackets being hinged to the annular conveying chain along a circumference of the annular conveying chain.

3. The scooter storage box as claimed in claim 2, wherein the bracket further comprises a hanger, the hanger being connected with a chassis of the bracket, the hanger being configured to hang the chassis, the hanger being hinged to the annular conveying chain to make the chassis keep horizontal.

4. The scooter storage box as claimed in claim 2, wherein the annular conveying chain is provided around a predetermined axis, and a length direction of the bracket is parallel to the predetermined axis;
    an extending direction of the access port is parallel to a width direction of the bracket, so as to put in or take out the electric scooter along the width direction of the bracket at the access port.

5. The scooter storage box, as claimed in claim 1, further comprising:
    a lifting door, movably provided on the box body, the lifting door being configured to open or close the access port.

6. The scooter storage box as claimed in claim 1, further comprising:
    an operation panel, provided on the box body, the operation panel being configured for user operation.

7. The scooter storage box as claimed in claim 1, further comprising:
    a recognizer, provided on the box body, the recognizer being configured to recognize information of the electric scooter.

8. A scooter storage box for storing an electric scooter, the scooter storage box comprising a box body and a bracket provided in the box body, the bracket being the bracket of the scooter storage box as claimed in claim 1, an access port being provided on the box body, the access port being configured to take out and put in the electric scooter, wherein the chassis comprises:
    a limiting plate, the limiting plate being provided with a strip-shaped through hole, an edge of the strip-shaped through hole being configured to guide and limit an wheel;
    a carrying plate, an end surface of the carrying plate abutting against the lower surface of the scooter body of the electric scooter to carry the scooter body, the end surface of the carrying plate being the carrying surface; and
    a connecting plate, the connecting plate being configured to connect the limiting plate and the carrying plate.

9. A scooter storage box for storing an electric scooter, the scooter storage box comprising a box body and a bracket provided in the box body, the bracket being the bracket of the scooter storage box as claimed in claim 8, an access port being provided on the box body, the access port being configured to take out and put in the electric scooter, wherein the carrying plate is horizontally provided, the connecting plate is inclined relative to a horizontal plane, the limiting plate is located below the carrying plate, there are two carrying plates, there are two connecting plates, the two carrying plates and the two connecting plates are connected in one-to-one correspondence, and an area between the two connecting plates and the limiting plate forms the recess portion.

10. A scooter storage box for storing an electric scooter, the scooter storage box comprising a box body and a bracket provided in the box body, the bracket being the bracket of the scooter storage box as claimed in claim 1, an access port being provided on the box body, the access port being configured to take out and put in the electric scooter; wherein the bracket further comprises: a vertical plate, the vertical plate being provided on the chassis and located at one end of a length direction of the chassis, the charging portion comprising:

a charging plug, provided on the vertical plate, the charging plug being electrically connected with the electric scooter to charge the electric scooter, wherein after being put to a predetermined position on the chassis, the electric scooter can be in insertion connection with the charging plug to realize electrical connection.

11. A scooter storage box for storing an electric scooter, the scooter storage box comprising a box body and a bracket provided in the box body, the bracket being the bracket of the scooter storage box as claimed in claim 10, an access port being provided on the box body, the access port being configured to take out and put in the electric scooter; wherein there are one vertical plate and one charging plug, and an end, away from the vertical plate, of the chassis is a taking and putting end for taking out and putting in the electric scooter; or, there are two vertical plates and two charging plugs, the two vertical plates are located at both ends of the chassis respectively, the two charging plugs and the two vertical plates are provided in one-to-one correspondence, an area, located between the two vertical plates, of the chassis is a taking and putting area for taking out and putting in the electric scooter, and the electric scooter may be in insertion connection with one of the two charging plugs selectively.

12. A scooter storage box for storing an electric scooter, the scooter storage box comprising a box body and a bracket provided in the box body, the bracket being the bracket of the scooter storage box as claimed in claim 1, an access port being provided on the box body, the access port being configured to take out and put in the electric scooter, wherein the charging portion comprises:

a wireless charging device, provided on the chassis, the wireless charging device being configured to wirelessly charge the electric scooter.

13. The scooter storage box as claimed in claim 1, further comprising:

a face recognition device, provided on the box body, the face recognition device being configured for user recognition.

14. The scooter storage box as claimed in claim 6, further comprising:

a face recognition device, provided on the box body, the face recognition device being configured for user recognition.

15. The scooter storage box as claimed in claim 1, further comprising:

a positioning device, provided on the box body.

16. The scooter storage box as claimed in claim 7, further comprising:

a positioning device, provided on the box body.

17. A scooter storage box for storing an electric scooter, the scooter storage box comprising a box body and a bracket provided in the box body, the bracket comprising:

a chassis, the chassis being provided with a recess portion for accommodating a wheel of the electric scooter, the chassis being further provided with a carrying surface abutting against a lower surface of a scooter body of the electric scooter; and a charging portion, electrically connected with the electric scooter to charge the electric scooter, wherein, an access port being provided on the box body, the access port being configured to take out and put in the electric scooter, wherein the chassis comprises:

a limiting plate, the limiting plate being provided with a strip-shaped through hole, an edge of the strip-shaped through hole being configured to guide and limit an wheel;

a carrying plate, an end surface of the carrying plate abutting against the lower surface of the scooter body of the electric scooter to carry the scooter body, the end surface of the carrying plate being the carrying surface; and a connecting plate, the connecting plate being configured to connect the limiting plate and the carrying plate.

18. A scooter storage box for storing an electric scooter, the scooter storage box comprising a box body and a bracket provided in the box body, the bracket comprising:

a chassis, the chassis being provided with a recess portion for accommodating a wheel of the electric scooter, the chassis being further provided with a carrying surface abutting against a lower surface of a scooter body of the electric scooter; and a charging portion, electrically connected with the electric scooter to charge the electric scooter, wherein, an access port being provided on the box body, the access port being configured to take out and put in the electric scooter; wherein the bracket further comprises: a vertical plate, the vertical plate being provided on the chassis and located at one end of a length direction of the chassis, the charging portion comprising:

a charging plug, provided on the vertical plate, the charging plug being electrically connected with the electric scooter to charge the electric scooter, wherein after being put to a predetermined position on the chassis, the electric scooter can be in insertion connection with the charging plug to realize electrical connection.

* * * * *